Nov. 15, 1966  C. J. KOESTER ETAL  3,286,193
LASER STRUCTURE INCLUDING LASER ENERGY TRANSPARENT
ENERGY-DIVERTING MASKING ELEMENTS
Filed July 27, 1962  2 Sheets-Sheet 1
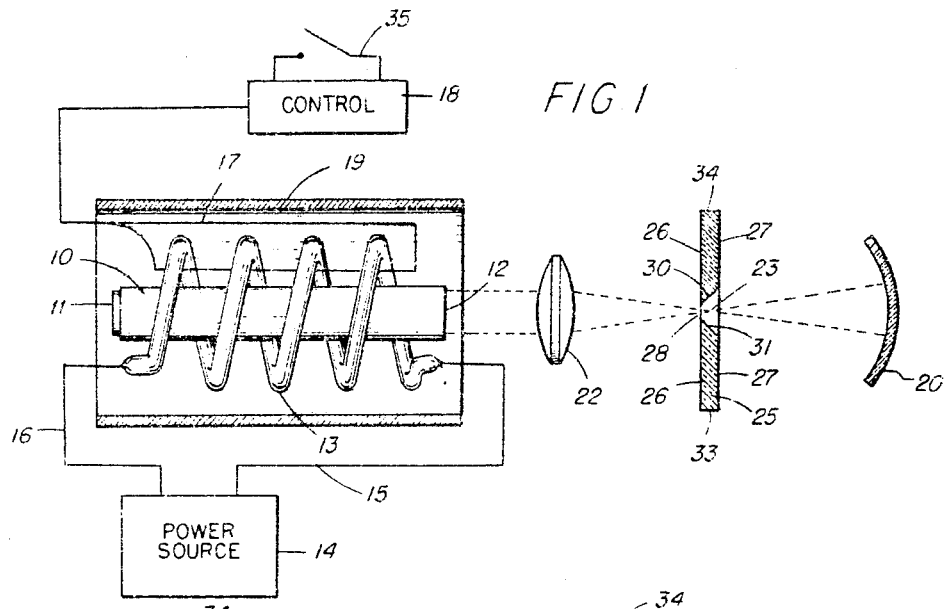
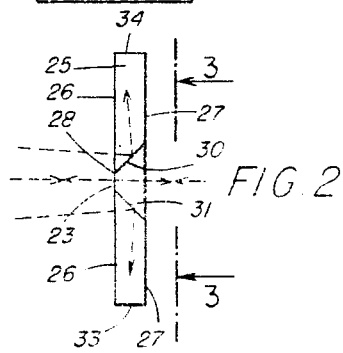
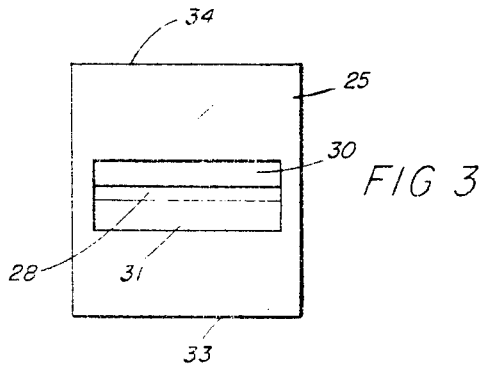
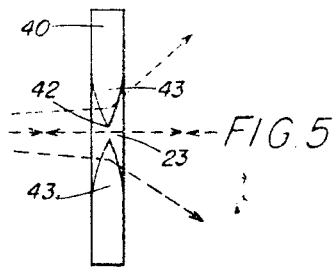
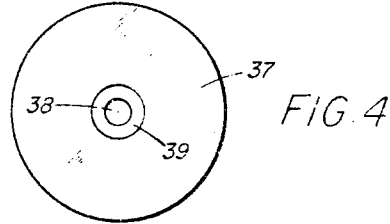
INVENTORS
Charles J. Koester
Edgar O. Dixon
By John A. Harvey
Attorney

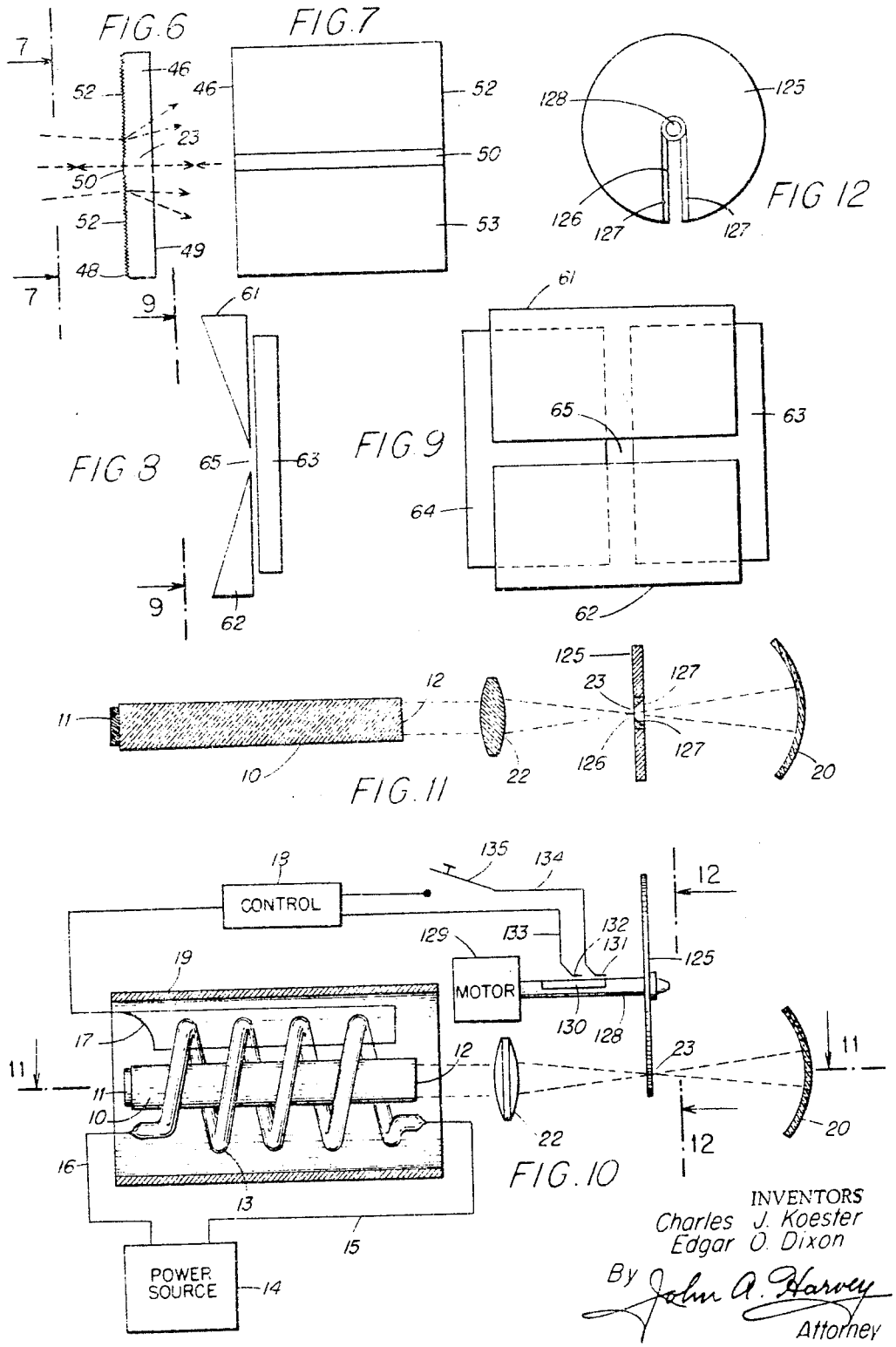

United States Patent Office 3,286,193
Patented Nov. 15, 1966

3,286,193
LASER STRUCTURE INCLUDING LASER ENERGY TRANSPARENT ENERGY-DIVERTING MASKING ELEMENTS
Charles J. Koester, South Woodstock, and Edgar O. Dixon, East Woodstock, Conn., assignors to American Optical Company, Southbridge, Mass., a voluntary association of Massachusetts
Filed July 27, 1962, Ser. No. 212,909
15 Claims. (Cl. 331—94.5)

This invention relates to wave-energy masking elements for lasers, and particularly to masking elements adapted to control the bidirectional reflection of wave energy in the resonant cavity of a laser structure. In a more particular sense, it relates to masking elements constituted to define a region through which bidirectional reflection can occur and to dissipate wave energy not directed through this region. The invention pertains specifically to improved masking elements of such character, capable of dissipating wave energy without undergoing structural deterioration over protracted periods of laser operation.

Lasers, sometimes referred to as optical masers, are light-amplifying devices and are specifically adapted to produce high-intensity coherent monochromatic light concentrated in a narrow beam. They find use in diverse fields as sources of such light energy, being employed for example in arts wherein it is desired to deliver light energy in intense and highly concentrated form to a relatively small target area.

Light is produced in a laser by photonic emission from the active atoms of a body composed of a so-called laser material. This emission occurs incident to the transition of the atoms from an excited upper energy level to a lower energy level. Accordingly, laser operation essentially involves exciting active atoms in the laser body to such upper energy level and inducing the emissive transition of the excited atoms in a manner controlled to utilize the light thereby emitted to provide the desired laser output pulse. The nature and number of interlevel transitions which must be effected in a complete atomic cycle of laser operation are dependent on the properties of the particular laser material used.

By way of example, one conventional form of laser structure includes a rod-shaped body composed of a suitable solid laser material surrounded concentrically by a helical gaseous-discharge flash tube adapted to emit a pulse of light specifically including light in the wavelength of an absorption band of the laser material. When the flash tube is actuated, this light pulse enters the laser body, is absorbed by the laser material, and thereby pumps the body with energy of such absorptive wavelength. This pumping excites active atoms in the laser body to shift from an initial low energy level in a series of interlevel transitions, typically involving a first energy-absorptive transition to a very unstable high energy level and an immediately subsequent spontaneous transition (with release of heat energy but presently regarded as non-emissive) from this unstable level to the somewhat more stable upper energy level referred to above (intermediate in energy between the aforementioned initial and unstable levels) and from which light-emissive transition occurs. Thus the pumping pulse provides the excitation step in laser operation, creating a very large population of atoms at the upper energy level in the laser body. The establishment of this large upper level population is referred to as inversion of energy states of the body.

For effecting induced light-emissive transition from this level to complete the atomic cycle of laser operation, the laser body of the structure is disposed coaxially within a resonant cavity defined between opposed reflective cavity ends. Immediately upon the inversion of energy states of the body, individual atoms at the aforementioned upper energy level begin to undergo emissive transition spontaneously, shifting to a lower energy level or terminal level (which may or may not be the initial, lowest energy level, i.e. the ground state, depending on the nature of the laser material used) with concomitant emission of light. Since this upper energy level is relatively stable in a laser material, such spontaneous emission would deplete the enlarged upper level population at a comparatively slow rate. However, a portion of the light emitted by the spontaneously emitting atoms passes through the resonant cavity to the ends thereof and is thence reflected back and forth through the cavity between the reflective cavity ends, passing and repassing in multiple bidirectional reflections. This bidirectionally reflected light immediately excites other atoms at the upper energy level to induce them to undergo emissive transition to the terminal level, producing more light, which augments the bidirectionally reflected light in the cavity to induce still further emissive transitions from the upper level population. In such fashion a rising pulse of bidirectionally reflected light quickly develops within the cavity, reaching a quantitatively large value as the induced emissive transition of atoms from the upper level population becomes massive. Light of high intensity is accordingly created in one or a succession of light pulses while the pumping light is present, the action continuing until depletion of this population by such transitions restores the laser body to a normal energy state. To permit emission of such portion of this large bidirectionally reflected light pulse or pulses from the laser cavity, one reflective end of the cavity is made partially transmissive. The fraction of the bidirectionally reflected light escaping therethrough constitutes the laser output pulse.

It has been found that the intensity of the useful portion of the laser output pulse can be enhanced by restricting the bidirectional reflection of light in the laser cavity to light emitted in certain selected modes of propagation. The atoms in a laser body emit light in a plurality of such modes, including the modes for the plane waves propagated parallel to the long axis of the body, hereinafter designated the axial plane wave modes, and modes for waves directed at angles to the axis, hereinafter referred to as off-axis modes. In particular, if the only light allowed to reflect bidirectionally through the cavity were light emitted in the axial plane wave modes, so as to effect stimulation of emission predominantly by modeselected plane wave light energy, a high degree of emissive efficiency would be achieved. The laser output of light in the plane wave front (the useful portion of the output pulse) would be significantly greater than it is when bidirectional reflection of light in off-axis modes is allowed ot develop in the cavity; the beam spread angle of the output pulse would be reduced; and as a result the output intensity, or power per unit area delivered by the laser at any given distance (an inverse function of the beam spread angle), would be advantageously increased. Correspondingly, it has been found that in general, to the extent that bidirectional reflection of light emitted in the off-axis modes can be inhibited, the intensity of the laser output pulse may be desirably improved.

In one preferred system for effecting such mode-selective laser operation, light emitted from the laser body and reflecting back and forth within the cavity is focused as by a suitable lens through a focal point intermediate the body and one of the reflective cavity ends. A mask defining an aperture is positioned in the cavity so that the aperture coincides with this focal point. The aperture permits light in selected modes to pass through the focal point, while the surrounding mask, occluding a portion of the image formed by the lens at the focal point, dissipates light energy emitted in other modes. Thereby bidirectional reflection of light in the cavity is limited to modes for waves directed through the aperture by the lens; light emitted in other modes cannot pass beyond the focal point to the aforementioned cavity end, and thus cannot reflect bidirectionally between this end and the opposed cavity end, because it is blocked by the mask.

The mask referred to above may be a plane opaque member having a surface of minimal reflectivity pierced by a slit, aperture, or other opening of appropriate configuration (ordinarily smaller, at least in minimum dimension, than the image formed at the focal point by the lens with a conventional laser as the source); light not directed through the aperture is absorbed on the surface of the mask in the region adjacent the aperture. If this absorbed energy is sufficiently intense, however, it may tend to cause vaporization or other deterioration of the mask material in the latter region, with the result that the aperture is enlarged. Since any enlargement of the aperture permits bidirectional reflection of light in undesired modes, decreasing the efficacy of the mask in providing sharp mode selection in the cavity, avoidance of such deterioration of the mask would be desirable.

Similar masking elements may also be employed for other purposes in laser structures. By way of example, with emitted light from the laser body focused as before through a focal point in the cavity intermediate the body and one of the reflective cavity ends, an aperture-defining mask or shutter element may be movably mounted to shift between a position totally occluding the focal point and a position in which the aperture coincides with the focal point to permit bidirectional reflection of light therethrough, as disclosed and claimed in the copending application of Charles J. Koester, Serial No. 212,989, filed July 27, 1962, entitled, Laser Structure, and assigned to the same assignee as the present application. This arrangement of elements provides so-called Q switching operation. The Q or quality factor of the cavity is proportional to the ratio of wave energy storage to wave energy dissipation per wave energy cycle therein. When the shutter is in position occluding the focal point, light emitted from the laser body cannot reflect back and forth between the reflective cavity ends, but is dissipated at the shutter surface, and the cavity-providing structure is said to be in a low Q condition; when the shutter aperture intersects the focal point so that bidirectional reflection can occur, a high Q condition obtains in the cavity. Thus movement of the shutter as described above switches the cavity-providing structure between these conditions.

Such Q switching, properly synchronized with the initiation of the pumping light pulse from the flash tube, enables attainment of a laser output pulse of advantageously superior peak power. As will be understood, in laser operation of the character previously described, the energy-pumping pulse is of finite duration; excitation of atoms in the laser body to the upper level accordingly occurs throughout a finite time period. If the cavity structure is maintained internally reflective at both ends, light emitted by spontaneous emission from atoms at the upper level begins to reflect back and forth in the cavity and in so doing to induce emissive transitions of other upper level atoms in significant number at a so-called threshold point which is reached substantially before the end of this pumping period. Thus for a considerable portion of the pumping period, the effect of the pumping pulse in augmenting the upper level population is offset by the depletion of the latter population due to such induced transitions, with the result that the magnitude of the upper level population levels off prematurely at a plateau instead of continuing to increase as would otherwise be possible in the absence of induced emission. If on the other hand the transition-inducing state created by multiple light reflections is retarded until a later time in the pumping period, the same pumping pulse can create a significantly larger maximum upper level population in the laser body; and because the magnitude of the peak power attained by the laser output pulse is directly related to the magnitude of this maximum upper level population, such prevention of premature bidirectional light reflection enables attainment of a peak power output desirably greater than that produced with threshold laser operation. This prevention of premature bidirectional reflection is provided with the above-described Q switching arrangement by maintaining the shutter in position occluding the focal point for a predetermined time after initiation of the pumping pulse. When the shutter aperture is carried into register with the focal point at the latter time, bidirectional reflection commences immediately and rapidly builds up by induced emission from the very large upper level population previously established to produce a fast-rising output pulse of desirably high peak power.

As in the case of the aforementioned mode-selective masking elements, the Q switching shutter may be a plane opaque aperture-defining member having a surface of minimal reflectivity which absorbs light when it is in position occluding the focal point. However, absorption of light energy on the surface of the shutter adjacent the aperture (particularly while the aperture is being carried into or out of register with the focal point, and while it is in register therewith) may, as before, tend to vaporize or otherwise deleteriously deform the edges of the aperture.

An object of the present invention is to provide a new and improved wave-energy masking element for preventing undesired bidirectional reflection of wave energy in a resonant laser cavity structure.

Another object is to provide such new and improved masking element, adapted to permit transmission and development of bidirectional reflection of wave energy through a defined restricted region and to dissipate wave energy directed externally of such region, and capable of withstanding extended use without deteriorating.

A further object is to provide a masking element of new and improved character, adapted to control bidirectional reflection of wave energy through a focal point in a laser resonant cavity srtucture wherein wave energy emitted from the laser body is focused through such focal point intermediate the body and one reflective end of the cavity, without undergoing vaporization or other deterioration due to extended or repeated impingement of wave energy thereon.

Yet another object is to provide a novel mode-selective masking element, for a resonant laser cavity structure, defining a region through which wave energy can pass in multiple bidirectional reflections and adapted to dissipate wave energy emitted in wave modes not directed through this region without undergoing deterioration or deformation due to such dissipation of wave energy.

A still further object is to provide an improved Q switching shutter element, for a resonant laser cavity structure, defining a region through which wave energy can pass in multiple bidirectional reflections, and adapted to dissipate wave energy not directed through this region without undergoing vaporization or other deformation adjacent such region.

An additional object is to provide a mode-selective laser structure of novel and advantageous character, including a mode-selective masking element which is adapted to permit bidirectional reflection of wave energy emitted in selected modes and to dissipate wave energy emitted in other modes and which is further adapted to effect such wave energy dissipation without undergoing structural deterioration.

Another object is to provide a new and improved Q switching laser structure which includes a shiftably positionable shutter element defining a region through which wave energy can pass in multiple bidirectional reflections, and adapted to dissipate wave energy not directed therethrough without undergoing deterioration of the shutter portion adjacent this region.

Further objects and advantages of the invention will be apparent from the detailed description hereinbelow set forth, together with the accompanying drawings, wherein:

FIG. 1 is a schematic view of a laser structure incorporating one embodiment of the invention;

FIG. 2 is an enlarged diagrammatic section view of the embodiment of FIG. 1;

FIG. 3 is a view taken along plane 3—3 of FIG. 2;

FIG. 4 is a view, taken as along plane 3—3 of FIG. 2 of an alternative embodiment of the invention;

FIG. 5 is a diagrammatic section view of another embodiment of the invention;

FIG. 6 is a diagrammatic section view of a further embodiment of the invention;

FIG. 7 is a view taken along plane 7—7 of FIG. 6;

FIG. 8 is a schematic side view of a further embodiment of the invention;

FIG. 9 is a view taken along plane 9—9 of FIG. 8;

FIG. 10 is a schematic view of another type of laser structure incorporating an embodiment of the invention;

FIG. 11 is a simplified diagrammatic view of the structure of FIG. 10, taken along plane 11—11 of FIG. 10; and FIG. 12 is a simplified view of the embodiment of FIG. 10, taken along plane 12—12 of FIG. 10.

Referring first to FIG. 1, the invention in the embodiment illustrated is there shown in association with elements comprising a mode-selective laser structure. This structure includes, as an active laser component, a cylindrical rod-shaped body 10 of solid laser material (such as synthetic crystalline ruby) having opposed, plane, parallel end faces perpendicular to its long axis. One end face of the body is silvered, as indicated at 11, to make it internally reflective; the other end face 12 is nonreflective or transmissive, as are the side walls of the body.

A source of pumping light energy for the rod 10 is provided by a helical flash tube 13, disposed to surround the rod concentrically for substantially the entire rod length but in spaced relation to the side wall of the rod. This flash tube functions on the gaseous discharge principle, and is specifically adapted to emit pulses of light including light in the wavelength of an absorption band of the laser material. It is powered from an appropriate power source 14, of conventional design and including a high-voltage source of electric current and capacitors for energy storage, which are connected through leads 15, 16 to electrodes provided in opposite ends of the tube. Typically, such a power source for a laser system flash tube may be adapted to provide an input to the flash tube of about 2500 joules, at a voltage between about 3 and about 5 kv.

The pulse producing discharge in the flash tube is initiated by means of a trigger circuit 17, shown as encircling the turns of the helical flash tube in proximity thereto and powered from a suitable control instrumentality indicated at 18. The character and arrangement of these elements is such that with sufficient charge energy developed in the power source 14, a high voltage electrical pulse sent to the trigger circuit 17 by the control instrumentality 18 will cause such pulse-producing discharge in the flash tube, and thus produce an input of pumping light energy to the laser rod at a time controlled by the instrumentality 18.

The laser rod and flash tube are surrounded concentrically by an open-ended hollow cylindrical member 19 having a reflective surface, to contain the pumping light emitted by the flash tube within the chamber so that a substantial fraction will be absorbed by the rod. In addition, to protect the silvered surface of the rod end face 11 from being impacted by light emitted from the flash tube, a protective cap of suitable design (not shown) may be provided for this end face of the laser rod.

With the elements described above, an inversion of energy states of the laser rod 10 is effected by developing sufficient charge energy in the power source 14 for the desired gaseous discharge in the flash tube, and then passing an electrical pulse from the control instrumentality 18 through the trigger circuit 17 to initiate such discharge. Thereby a pulse of light, including light of the requisite pumping wavelengths, is produced by the flash tube. The light energy of this pulse passes into the rod 10 through the transmissive side walls thereof. Photons of this pumping energy are absorbed by active atoms in the rod to cause them to shift from an initial low energy level to a very unstable high energy level, in an energy-absorptive transition; from that unstable level the atoms immediately shift again, in spontaneous transition, to the relatively stable upper energy level from which emissive transition occurs. In this manner the pumping light pulse from the flash tube effects the establishment of a very large population of atoms at the latter level in the laser rod.

The rod 10 is adapted to constitute the first segment of a resonant cavity or wave-energy propagation path extending from the reflective rod end face 11 (which provides the first terminus of the cavity) coaxially through the rod and beyond the transmissive end face 12 to a concave spherical mirror 20, disposed externally of the rod in coaxial relation thereto so as to reflect light toward the end face 12. A positive convex lens 22 is also included in the cavity-providing structure, disposed intermediate the rod end face 12 and the mirror 20 in fixed coaxial relation thereto.

These cavity elements are mutually arranged and adapted to permit bidirectional reflection of light between the reflective rod end face 11 and the spherical mirror 20 through a focal point 23 in the cavity intermediate the lens and mirror. Thus, light emitted in the rod and emerging from the transmissive rod end face 12 is focused by the lens 22 through the focal point 23. The location and configuration of the mirror are chosen so that light diverging from the point 23 to the mirror is reflected by the mirror back through the point 23 to the lens, which collimates it for re-entry into the rod end face 12 parallel to the axis of the rod. Thence passing through the rod, the light reflects off the plane perpendicular reflective end face 11, back through the rod to the lens and thence through the focal point 23 to the mirror 20, developing as multiple bidirectional reflections of light passing and repassing through the focal point 23. This optical system, in cooperation with the aperture-defining mask hereinafter described, has a mode-selective effect in the laser cavity. These elements combine to restrict bidirectional reflection of light in the cavity to light in modes for waves directed through the mask aperture, which is positioned to coincide with the focal point 23, light in other modes being dissipated by those portions of the mask structure which surround the aperture at the focal point.

The mask of the present invention in its illustrated embodiment is associated with the foregoing elements to provide mode selection of particular sharpness. As shown, the mask comprises a solid element generally designated 25 fabricated of a suitable transparent material such as glass and typically but not necessarily having opposed plane parallel surfaces 26, 27. A slit 28 is cut through this element. The edges of the mask providing the side walls 30, 31 of the slit are slanted or beveled, for example at a 45° angle to the plane outer surfaces of the mask, to provide a slit region of incremental cross-sectional area opening away from the mask surface 26 and toward the mask surface 27. This mask 25 is positioned in the above-described cavity-providing structure, with its opposed surfaces 26, 27 perpendicular to the axis of the cavity, so that the slit 28 coincides with the focal point 23 and the incremental slit area defined by the walls 30, 31 opens away from the rod 10.

As will be understood, if the mask were not included in the structure, the lens 22 would form a more-or-less circular image at the focal point 23. The slit 28 is proportioned so that the opening in the mask surface 26 is smaller in width by a selected amount than the diameter of this image. Thus only a portion of the light which would thus be emitted from the rod end face 12 and focused by the lens to the point 23 can pass through the slit to the mirror 20. Specifically, the slit is dimensioned so as to permit passage predominantly of light emitted in the axial plane wave modes (focused by the lens in the central portion of the image at the point 23).

Any light emitted from the rod end face 12 in other modes, focused by the lens in the peripheral portions of the image formed at the focal point 23 and not directed by the lens through the slit 28, passes into the transparent mask 25 through the surface 26 in the region thereof adjacent the slit. The side walls 30, 31 of the slit, slanting away from the cavity axis, reflect this light at a sharp angle away from the cavity, for example through the transparent mask body more-or-less parallel to the external surfaces thereof. In other words, the regions of the mask adjacent the slit 28 serve as reflective prisms, directing the latter light out of the cavity. This light may pass out of the structure, as through the ends 33, 34 of the mask, or alternatively these ends may be provided with a suitable light-absorbing surface to absorb such light. In either event, the light not directed through the slit 28 is dissipated out of the cavity and thereby prevented from reflecting back and forth between the rod end face 11 and the mirror 20.

This development of bidirectional reflection through the focal point 23 in the cavity can occur only in modes directing light through the slit 28, the other portions of the image formed by the lens 22 at the focal point being dissipated by the mask 25 as described above. By properly dimensioning the slit 28, a very high degree of mode selection can be achieved. Not only does the lens 22 have a mode-selective effect in focusing light in the desired modes through the focal point 23 but, in addition, light emitted in the undesired off-axis modes (including light in such modes refracted by the lens through the peripheral portions of the image formed at the point 23) is reflectively dissipated out of the cavity by the mask 25. In this way, the desired condition of bidirectional reflection restricted to light emitted in the axial plane wave modes can be approached, with resultant increase in emissive efficiency, narrowed output beam, and augmented output light intensity.

At the same time the edges of the mask defining the slit are not subject to vaporization or other deterioration incident to the aforementioned dissipation of light energy, because they absorb very little of the light energy which impinges on them, but instead dissipate it by directing it out of the cavity structure. Consequently, the slit does not tend to become enlarged during extended or repeated laser operation, but preserves its original dimension, and the efficacy of the mask in providing mode selection of the desired sharpness accordingly remains unimpaired.

In the light of the foregoing description, the operation of the structure of FIG. 1 will now be apparent. With sufficient charge energy developed in the power source 14, the control instrumentality 18 is actuated (as by closing a manually operated switch 35) to initiate the pumping light pulse from the flash tube 13. Thereby the rod 10 is pumped with light energy in the absorptive wavelength, and an inversion of energy states is effected in the rod, in the manner previously described. As individual atoms of the enlarging upper level population in the rod undergo spontaneous emissive transition to the terminal level with emission of light energy, a portion of this light energy begins to reflect back and forth in the cavity, between the reflective rod end face 11 and the mirror 20. However, primarily only that portion of the light emitted in modes for waves directed through the slit 28 by the lens 22 (predominantly the axial plane wave modes) can thus reflect bidirectionally through the cavity; the lens and the mask 25 largely dissipate light emitted in other modes. Thus bidirectional reflection builds up (augmented by induced emission from other atoms of the upper level population stimulated by the light already reflecting back and forth through the cavity) chiefly in the selected modes. As will be appreciated, this bidirectionally reflected light passes through the cavity in a wedge-shaped beam, corresponding in configuration to the portion of the image at the focal point 23 not occluded by the slit-providing mask. A large mode-selected bidirectionally reflected light pulse thereby quickly develops; with one end of the cavity-providing structure (for example, the rod end face 11) constituted partially light-transmissive, a portion of this bidirectionally reflected light is emitted therethrough as the laser output light pulse, continuing until the laser rod 10 is restored to a stable energy state. Another such cycle of laser operation may then be initiated as soon as sufficient charge energy is again developed in the power source 14.

The mode-selective masking element of the present invention may be modified in various ways. For example, it may be shaped to provide an opening of square or other configuration rather than a parallel-sided slit. Thus, as shown in FIG. 4, a transparent masking element 37 may be shaped to define a circular aperture 38 of suitable dimension, surrounded by an annular slanting wall 39 defining a frusto-conic region. As in the case of the slit-providing mask described above, this mask is positioned at the focal point 23 of the structure shown in FIG. 1, perpendicular to the cavity axis, with the aperture positioned to coincide with the focal point and the frusto-conic region defined by the slanting wall 39 opening away from the laser rod 10. In such position, this mask 37 functions in a manner analogous to the slit-defining mask 25. The development of bidirectional reflection of light in the cavity is limited to light directed through the aperture 38, which is predominantly light emitted in the axial plane wave modes; most of the light emitted in other modes passes through the transparent mask surface to the annular slanting wall 39, which reflects it out of the cavity, inhibiting bidirectional reection of light in such modes in the cavity. Since this circular-apertured mask occludes the entire periphery of the more-or-less circular image which the lens 22 would form at the focal point 23, it prevents bidirectional reflection of light in off-axis modes even more effectively than the slit-defining mask of FIGS. 1–3 (which occludes only opposed segments of the periphery), and provides a bidirectionally reflected beam of circular cross-section rather than the wedge-shaped beam provided by the slit-defining mask.

In further alternative forms, the portion of the mask defining the opening or region through which bidirectional reflection of light can occur may be modified to divert light out of the cavity in ways other than by reflection. One such modification is illustrated in FIG. 5. The mask there shown comprises a solid transparent element 40 defining an opening 42, and is adapted to be positioned in the laser structure of FIG. 1 (in place of the mask 25) perpendicular to the axis of the resonant cavity, with the opening 42 coinciding with the focal point 23. The portions of the mask defining the opening, indicated at 44, are of appropriate lenticular configuration adapted to refract light, directed through them by the lens, out of the cavity at a substantial angle to the cavity axis. Thus, as in the case of the above-described masks, bidirectional reflection of light is predominantly limited by this mask 40 to modes for waves directed by the lens through the opening 42; light not so directed is refracted out of the cavity by the lenticular portions 44, and thereby prevented from reection back and forth in the cavity. As before, the opening 42 may be a slit, or an aperture of circular or other configuration as desired.

A further embodiment of the invention is illustrated in FIGS. 6 and 7, comprising a mask 46 made of a suitable transparent material such as glass and having opposed plane surfaces 48, 49. The surface 48 includes a polished, fully transparent portion 50 surrounded by etched portions 52 of light-diffusing character. Such surface characteristics may be provided, for example, by first polishing the surface 48 and then exposing it to a suitable glass-etching acid (such as hydrofluoric acid) while protecting the portion 50 from acid action with a suitable coating of paraffin or like substance, which is subsequently removed. When this mask is positioned in the laser structure of FIG. 1 (in place of the mask 25) perpendicular to the axis of the resonant cavity, with the transparent surface portion 50 coinciding with the focal point 23 and the surface 48 directed toward the rod end face 12, light emitted in modes for waves directed by the lens 22 through the surface portion 50 can pass through the transparent mask to the mirror 20, and thus can reflect back and forth in the cavity. Light emitted in modes for waves not so directed impinges on the etched portions 52 of the surface 48; these latter portions diffuse this light out of the cavity, and so inhibit bidirectional reflection of light in such modes. In other words, in place of the aperture or other opening of the foregoing structures, the surface portion 50 provides a fully transparent mask region through which light can reflect back and forth in the cavity, and the etched portions 52 of the surface 48 correspond to the aperture-surrounding portions of the above-described masks, directing light out of the cavity by diffusion. The transparent surface portion 50 may be of elongate parallel-sided configuration as shown in FIG. 7, or of circular or other configuration, to provide a region (through which bidirectional reflection can occur) of desired shape and dimension corresponding to the slit or circular or other aperture provided by the mask structures shown in FIGS. 1–5. In this mask structure, it is important that the transparent portion through which bidirectional reflection occurs be very clean, since the presence of dust or other light-absorptive material on the surface of this transparent portion might tend to cause deterioration of this portion due to absorption of the high-intensity light impinging thereon in laser operation.

Another alternative embodiment of the mask structure of the present invention is illustrated in FIGS. 8 and 9. The mask there shown comprises four identical transparent members 61, 62, 63, 64, fabricated of glass or like transparent material, and each having plane rectangular faces and a wedge-shaped cross-section tapering to a thin edge. The members 61, 62 are paired in position parallel to each other with their aforementioned thin edges in opposed parallel relation defining a slit. The members 63, 64 are similarly paired in position parallel to each other with their thin edges in opposed parallel relation defining a second slit, and are disposed in contiguous or near contiguous relation to the members 61, 62 such that the slits respectively defined by the pairs of members 61, 62 and 63, 64 are essentially coplanar and axially perpendicular to each other. Thus the aforementioned slits cross, as shown in FIG. 9, forming a square-sided aperture 65 surrounded by the thin edge portions of the members 61, 62, 63, 64. When the mask of FIGS. 8–9 is substituted for the mask 25 in the laser cavity structure of FIG. 1, bidirectional reflection can occur in the cavity in those modes sending light through the aperture 65. Light in other modes impinges on the wedge-shaped aperture-defining members 61, 62, 63, 64 and is refracted away from the cavity axis by these members. Consequently the mask of FIGS. 8–9 provides mode selection in the structure of FIG. 1 in a manner similar to that of the mask structures hereinbefore described.

It will be understood that the members 61, 62, 63, 64 are held in the above described relation to each other by suitable supporting structure (not shown). If this supporting structure is of such character as to enable the individual members to be adjustably positioned in a lateral sense relative to one another, the dimensions of the aperture 65 may be varied as desired; for example, the aperture dimensions can be decreased by bringing these members closer together.

As will now be appreciated, all of the several embodiments described above provide a defined region (either an opening or a fully transparent region of the mask element) through which bidirectional reflection of light in selected modes can occur, surrounded by a mask portion or portions adapted to direct light impinging thereon out of the cavity so as to prevent bidirectional reflection of such light. Furthermore, since the light in nonselected modes is dissipated by being thus directed out of the cavity, rather than by absorption of light energy on the mask surface, vaporization or other deterioration of these mask portions is avoided in all of the above embodiments, and accordingly the region through which bidirectional reflection occurs does not tend to become undesirably enlarged under conditions of continued or repeated laser operation.

Another type of laser structure in which the element of the present invention may be incorporated is shown in FIGS. 10 and 11. The structure there illustrated is adapted to provide Q switching operation, and is of the type disclosed and claimed in the aforementioned copending application of Charles J. Koester, Serial No. 212,989. Identically numbered elements of FIG. 10 are similar to corresponding parts in FIG. 1. Thus the structure of FIG. 10 includes a laser rod 10 having a reflective end face 11 and a non-reflective transmissive end face 12. For provision of pumping energy to the rod 10, a flash tube 13 and associated power source 14 (with leads 15, 16), trigger circuit 17, and control instrumentality 18 identical in arrangement and function with the corresponding elements and instrumentalities illustrated in FIG. 1 are included in the structure, as is a light-concentrating cylindrical reflector 19. Also as in the structure of FIG. 1, the rod 10 constitutes the first segment of a resonant cavity extending from the reflective end face 11 through and beyond the rod 10 to a concave spherical mirror 20 disposed in fixed coaxial relation to the rod so as to reflect light toward the rod end face 12. A positive convex lens 22 is disposed coaxially within the cavity intermediate the rod 10 and mirror 20; as before, the lens and mirror are mutually arranged and adapted such that light emitted in selected modes reflects back and forth in the cavity through a focal point 23 intermediate the lens and mirror in the manner described above in connection with the structure of FIG. 1.

The mask of the present invention in the embodiment illustrated in FIGS. 10–12 is associated with the foregoing elements to provide Q switching operation in the laser structure. This mask is shown as a circular plane disc-shaped shutter element 125 defining an opening, here illustrated as a slit 126, surrounded by transparent portions having slanting side walls 127 which slope at angles to the plane surfaces of the disc to define a region of incremental cross-sectional area opening away from the slit 126; the remainder of the shutter is arranged so that light reflected from the region of the aperture is removed from the cavity. The shutter 125 is mounted on a shaft 128 driven by a suitable motor 129 to effect rotation of the shutter in a plane perpendicular to the axis of the resonant cavity at the focal point 23, and is so disposed as to intersect this focal point continuously during such rotation. The slit 126 is positioned on the shutter to scan the focal point 23 once during each complete shutter revolution.

The entire shutter structure is adapted to dissipate light without undergoing harmful deterioration. Specifically, when the transparent shutter portions adjacent the slit intersect the focal point 23, light directed to the focal point by the lens 22 passes into such portions and is thence reflected by the slanting side walls 127 at a sharp angle to the cavity axis such that it is directed out of the cavity and prevented from reflecting between the rod end face 11 and the mirror 20. In other words, these shutter portions function as reflecting prisms in like manner as the slanting wall portions 30, 31 of the mask element 25 shown in FIGS. 1–3 and described above, to dissipate light by directing it away from the cavity axis, with minimal absorption of light at the shutter surface; hence the shutter portions adjacent the slit (which might otherwise tend to deteriorate due to absorption of light) are capable of withstanding protracted or repeated exposure to light energy in laser operation without structural impairment. The remainder of the disc surface may be made opaque and essentially non-reflective, so that when it occludes the focal point, it prevents bidirectional reflection of light by absorbing light directed thereto; since this latter part of the disc may be made relatively thick and since the laser output energy is extremely small while this portion of the disc occludes the focal point it is not susceptible to significant deterioration by light energy absorption.

Consequently, except when the slit 126 is scanning the focal point, the shutter completely occludes the focal point in such manner as to prevent light in any mode from passing through the focal point between the lens and mirror, and thus maintains the cavity in a so-called low Q condition in which bidirectional reflection of light between the rod end face 11 and the mirror is entirely inhibited. When the slit scans the focal point, however, light can pass freely therethrough between the lens and mirror; hence light directed by the lens through the focal point can then reflect back and forth in the cavity, and the cavity is in high Q condition. With the slit in the latter position, the shutter 125 in cooperation with the lens 22 and mirror 20 has a mode selective effect, since only light in modes sending waves through the slit can reflect back and forth through the cavity, light in other modes being occluded by the shutter body.

Rotation of the shutter 125 therefore effects Q switching action in the laser structure, shifting the cavity-providing structure from a low Q condition to a high Q condition as it carries the slit 126 into position scanning the focal point 23 in the course of each cycle of shutter rotation. In the structure shown, this rotation is synchronized with the initiation of the pumping light pulse by the flash tube so that the Q switching action occurs at a predetermined finite time after the pumping pulse is initiated. The function of the shutter element of the invention as incorporated in the laser structure of FIGS. 10–11, and the advantageous results obtained therewith, may be further and more fully understood by detailed consideration of such synchronized operation. As an example of means suitable to provide such synchronized operation, there is shown a contact plate 130 mounted on the shaft 128 in appropriate angular relation to the slit 126 of the shutter 125, and contact points 131, 132 disposed to come into contact with the plate 130 simultaneously when the plate is brought into position for such contact by the rotation of the shaft. These points 131, 132 are connected to the control instrumentality 18 through leads 133, 134. A manually operable push switch 135 is connected in series with the points 131, 132.

When the switch 135 is closed, contact of the points 131, 132 with the plate 130 completes a circuit in the instrumentality 18, actuating the latter instrumentality to energize the trigger circuit 17 and thereby to initiate the pumping light-producing gaseous discharge in the flash tube 13. The plate 130 is positioned on the shaft 128 in such angular relation to the shutter slit 126 that it comes in contact with the points 131, 132 when the slit 126 is at a preselected angular position away from coincidence with the focal point 23. Thus the pumping light pulse from the flash tube 13 is initiated at a point in the cycle of shutter rotation when the focal point 23 is completely occluded by the shutter body so that the cavity-providing structure is in a low Q condition. With the shaft 128 and shutter 125 driven at a constant predetermined angular velocity by the motor 129, the shutter slit 126 is carried into coincidence with the focal point 23 (and thereafter out of such coincidence), switching the cavity from low Q to a high Q condition (and thereafter back to a low Q condition), at a predetermined finite time after the initiation of pumping. The length of the interval elapsing between pumping initiation and switching of the cavity to a high Q condition is determined by the angular relation between the plate 130 and shutter slit 126, and the angular velocity at which the motor 129 drives the shaft 128.

The operation of the above-described structure will now be readily understood. When the requisite charge energy has been developed in the power source 14 and the motor 129 is driving the shaft 128 at a predetermined angular velocity, the switch 135 is closed. As a result, the next time thereafter that the rotation of the shaft carries the plate 130 into contact with the points 131, 132, a circuit is completed in the control instrumentality 18. Immediately the trigger circuit 17 is energized, initiating gaseous discharge in the flash tube 13; the resultant pulse of light from the flash tube serves to pump light energy into the laser rod 10 and thereby to effect establishment of a very large upper level population of atoms in the rod, in the manner previously described. Because the plate 130 and shutter slit 126 are in the above-described angular relation, the cavity-providing structure is maintained in a low Q condition during the initial portion of the pumping period. Light emitted in the laser rod by spontaneous transition of atoms of the enlarging upper level population cannot reflect back and forth through the cavity structure, and therefore cannot induce emissive transitions of other atoms from the upper level population in significant number. As a result, the upper level population is not prematurely depleted during this low Q portion of the pumping period, but is enabled to increase far beyond the threshold point.

At a predetermined time after energization of the trigger circuit 17, the shutter slit 126 is carried into coincidence with the focal point 23, shifting the cavity structure from the low Q condition to a high Q condition. The time relation between energization of the trigger circuit 17 and rotation of the slit 126 into position coinciding with the focal point (determined by the angular relation of the plate 130 and slit 126, and the angular velocity at which the shutter is rotated) is preselected such that this Q switching occurs at a chosen moment in the pumping period after the inversion of energy states in the laser rod has reached a maximum value.

As soon as the shutter slit thus begins to scan the focal point, light emitted in the laser rod by atoms undergoing spontaneous emissive transition from the upper level begins to reflect back and forth through the cavity between the rod end face 11 and the mirror 20 through the focal point 23, causing progressive induced transitions of atoms from the greatly enlarged upper level population, with the result that a fast-rising pulse of bidirectionally reflected light provided by such massive induced emissive transitions, mode-selected in character because of the mode-selective effect of the combination of the slit, the lens 22 and the mirror 20, develops in the cavity. A portion of this bidirectionally reflected light is emitted from one end of the cavity (for example through the rod end face 11, if that end face is partially transmitting) to provide the laser output pulse. The continuing rotation of the shutter carries the slit 126 rapidly through and beyond the position in which it scans the focal point 23; as it passes out of this position, the cavity-providing structure reverts to a low Q condition for all modes, terminating the bidirectional reflection of light and the output pulse. Another pumping light pulse may then be initiated to start another such cycle of laser operation as soon as sufficient charge energy has been again developed in the power source 14.

The foregoing laser structure produces a peak power light output pulse of desirably large magnitude due to the synchronized Q switching in the structure, which permits the degree of inversion of the laser rod to develop to a high maximum value far beyond the threshold point during the pumping period. In addition, the structure affords singularly rapid Q switching operation and resultant very fast rise time of the output light pulse. This is because the focusing of light in the structure by the lens greatly restricts the cross-sectional area of the light propagation path at the focal point 23 where Q switching occurs, so that only a very small angular displacement of the shutter 25 is required to shift the shutter opening or slit 26 from a position just outside the propagation path (at which position the cavity-providing structure is still in a low Q condition) to a high Q-providing position fully scanning the path. Similarly, the duration of the high Q condition in the cavity and thus of the laser output light pulse is very short because of the small cross-sectional area of the propagation path at the focal point 23 and the fact that the shutter slit 126 is carried through and beyond it very quickly.

To these desirable results, the shutter element of the present invention contributes by providing a shutter structure defining an opening that can be carried repeatedly across the focal point 23, in protracted or repeated laser operation, without deterioration of the shutter portion defining such opening due to absorption of light energy thereon. In other words, the present invention provides for the above-described laser structure a shutter element of advantageously improved durability in which the defined opening does not become enlarged as a result of structural impairment of the shutter. As will be understood, such enlargement would be undesirable in that it would interfere with the operational characteristics of the Q switching laser structure.

Although a slit-defining shutter element having slanting side walls for the slit, to direct light reflectively out of the cavity, has been shown and described in connection with the above laser structure, it will be appreciated that modified forms of such shutter structure are equally embraced by the present invention. In particularly, the opening may be an aperture of circular or other desired configuration instead of a slit, and the portions of the shutter element defining this opening may be adapted to direct light out of the cavity in other ways than by reflection. Thus any of the alternative embodiments of the mask elements described above in connection with the mode selective laser structure of FIG. 1 could be adapted for use as shutter elements in this Q switching laser structure.

It is to be understood that the invention is not limited to the features and embodiments hereinabove specifically set forth, but may be carried out in other ways without departure from its spirit.

We claim:

1. In a laser structure, in combination, means providing a propagation path for laser emissive energy, said means including an active laser element through which said path extends; and at least one mask element formed of material substantially transparent at the laser emissive-energy wavelengths and interposed in said path and having a portion effective to divert from said path laser emissive energy incident upon said portion and with an edge of said portion contoured to define at least a portion of the boundary of a region adapted to provide propagation of laser emissive energy in said path, said region being coincident with a transverse cross-sectional area of said path.

2. In a laser structure, in combination, means providing a propagation path for laser emissive energy, said means including an active laser element through which said path extends; and at least one mask element formed of material substantially transparent at the laser emissive-energy wavelengths and interposed in said path and having a region coincident with a transverse cross-sectional area of said path and adapted to transmit high-intensity laser emissive energy propagated through said path, said mask element further having portions adjacent said region effective to divert from the propagation path any laser energy impinging upon said portions.

3. In a laser structure, in combination, means providing a propagation path for laser emissive-energy, said means including an active laser element through which said path extends; and at least one mask element formed of material substantially transparent at the laser emissive-energy wavelengths and interposed in said path and having an opening coincident with a transverse cross-sectional area of said path and adapted to transmit high-intensity laser emissive-energy propagated through said path, said mask element further having opening-edge portions effective to divert from the propagation path any laser energy impinging upon said edge portions.

4. In a laser structure, in combination, means providing a propagation path for laser emissive energy, said means including an active laser element through which said path extends; and at least one mask element formed of material substantially transparent at the laser emissive-energy wavelengths and interposed in said path and having an opening coincident with a transverse cross-sectional area of said path and adapted to transmit high-intensity laser emissive-energy propagated through said path, said mask element further having opening-edge portions providing sloping side walls adjacent said opening effective to divert from the propagation path any laser energy impinging upon said edge portions.

5. In a laser structure, in combination, means providing a resonant wave-energy propagation path, said means including an active laser element through which said path extends; and a mask element interposed in said path for selectively removing from said path laser emissive energy of preselected modes of propagation, said mask element being formed of material substantially transparent at the laser emissive-energy wavelengths and having an opening coincident with a transverse cross-sectional area of said path and adapted to transmit high-intensity laser emissive energy propagated through said path, said mask element further having reflective opening-edge portions effective to reflect from the propagation path laser energy of modes of propagation impinging upon said edge portions to divert laser energy of said last-mentioned modes out of said path.

6. In a laser structure, in combination, means providing a resonant wave-energy propagation path, said means including an active laser element through which said path extends; and at least one mask element formed of material substantially transparent at the laser emissive-energy wavelengths and interposed in said path and having an aperture defined by conical side walls, said aperture being coincident with a transverse cross-sectional area of said path.

7. In a laser structure, in combination, means providing a resonant wave-energy propagation path, said means including an active laser element through which said path extends and further including means for focusing laser emissive energy propagating in said path through a predetermined transverse cross-sectional area of said path at a given point therein external to said laser element; and a mask element formed of material substantially transparent at the laser emissive-energy wavelengths and interposed in said path at said given point and having an aperture coincident with and smaller than said predetermined cross-sectional area of said path and adapted to transmit high-intensity laser emissive-energy propagated through said path, said mask element further having aperture-edge portions providing slanting side walls adjacent said aperture on one side thereof effective to reflect from the propagation path any laser energy impinging upon said edge portions to divert laser energy impinging upon said edge portions out of said path.

8. In a laser structure, in combination, means providing a resonant wave-energy propagation path, said means including an active laser element through which said path extends; and a mask element interposed in said path for selectively removing from said path laser emissive energy of preselected modes of propagation, said mask element being formed of material substantially transparent at the laser emissive-energy wavelengths and having an opening coincident with a transverse cross-sectional area of said path and adapted to transmit high-intensity laser emissive energy propagated through said path, said mask element further having refractive opening-edge portions effective to refract from the propagation path laser energy of modes of propagation impinging upon said edge portions to divert laser energy in said last-mentioned modes out of said path.

9. In a laser structure, in combination, means providing a resonant wave-energy propagation path, said means including an active laser element through which said path extends and further including means for focusing laser emissive energy propagating in said path through a predetermined transverse cross-sectional area of said path at a given point therein external to said laser element; and a mask element formed of material substantially transparent at the laser emissive-energy wavelengths and interposed in said path at said given point and having an aperture coincident with and smaller than said predetermined cross-sectional area of said path and adapted to transmit high-intensity laser emissive energy propagated through said path, said mask element further having aperture-edge portions providing sloping side walls effective to refract from the propagation path any laser energy impinging upon said edge portions to divert laser energy impinging upon said edge portions out of said path.

10. In a laser structure, in combination, means providing a propagation path for laser emissive energy, said means including an active laser element through which said path extends; and at least one mask element formed of material substantially transparent at the laser emissive-energy wavelengths and interposed in said path and having a region coincident with a transverse cross-sectional area of said path and adapted to transmit high-intensity laser emissive energy propagated through said path, said mask element further having surface-etched portions adjacent said region effective to diffuse any laser energy impinging upon said surface-etched portions to divert from the propagation path any laser energy impinging upon said surface-etched portions.

11. In a laser structure, in combination, means providing a resonant wave-energy propagation path, said means including an active laser element through which said path extends; and a mask element interposed in said path for selectively removing from said path laser emissive energy of preselected modes of propagation, said mask element being formed of material substantially transparent at the laser emissive-energy wavelengths and having a transparent central portion, coincident with a transverse cross-sectional area of said path and adapted to transmit high-intensity laser emissive energy propagated through said path, surrounded by wave-energy diffusing surface portions effective to divert from the propagation path laser energy of modes of propagation impinging upon said surface portions.

12. In a laser structure, in combination, means providing a resonant wave-energy propagation path, said means including an active laser element through which said path extends and further including means for focusing laser emissive energy propagating in said path through a predetermined transverse cross-sectional area of said path at a given point therein external to said laser element; and a mask element formed of material substantially transparent at the laser emissive-energy wavelengths and interposed in said path at said given point and having a transparent central portion of circular cross-sectional area, smaller than and coincident with said predetermined cross-sectional area of said path and adapted to transmit high-intensity laser emissive energy propagated through said path, surrounded by wave-energy diffusing surface portions effective to divert from the propagation path any laser energy impinging upon said surface portions.

13. In a laser structure, in combination, means providing a propagation path for laser emissive energy, said means including an active laser element through which said path extends; and at least one mask element interposed in said path, said mask element comprising a plurality of members formed of material substantially transparent at the laser emissive-energy wavelengths and having edge portions relatively positioned to define an aperture coincident with a transverse cross-sectional area of said path and adapted to transmit high-intensity laser emissive energy propagated through said path, each said member having a portion adjacent said aperture effective to divert from the propagation path any laser energy impinging upon said last-mentioned portion.

14. In a laser structure, in combination, means providing a resonant wave-energy propagation path, said means including an active laser element through which said path extends; and a mask element interposed in said path for selectively removing from said path laser emissive energy of preselected modes of propagation, said mask element comprising a plurality of members formed of material substantially transparent at the laser emissive-energy wavelengths and relatively spaced along said path with edge portions cooperating to define an aperture coincident with a transverse cross-sectional area of said path and adapted to permit bidirectional propagation of laser energy along said path, each said member having a portion adjacent said aperture effective to divert from the propagation path laser energy of modes of propagation impinging upon said last-mentioned portion.

15. In a laser structure, in combination, means providing a resonant wave-energy propagation path, said means including an active laser element through which said path extends; and a mask element interposed in said path for selectively removing from said path laser emissive energy of preselected modes of propagation, said mask element comprising a first pair of transparent members arranged to define a first slit and each having wedge-shaped portions adjacent said first slit, and a second pair of transparent members arranged to define a second slit and each having wedge-shaped portions adjacent said second slit, said first and second pairs of transparent members being disposed in contiguous relation to each other such that said first and second slits are in substantially coplanar perpendicular relation forming a junction providing an aperture coincident with a transverse cross-sectional area of said path and adapted to transmit high-intensity laser emissive energy through said path, and said wedge-shaped portions of each of said transparent members providing edge portions adjacent said aperture effective to divert from the propagation path laser energy of modes of propagation impinging upon said edge portions.

References Cited by the Examiner

UNITED STATES PATENTS

| 1,848,587 | 3/1932 | Timson | 88—1 |
| 2,288,143 | 6/1942 | Sheppard | 88—14 |
| 2,837,968 | 6/1958 | Akaski | 88—39 |
| 2,964,998 | 12/1960 | Middlestadt | 88—61 |
| 3,064,523 | 11/1962 | Meltzer | 88—40 |

FOREIGN PATENTS 946,877  12/1948  France.

JEWELL H. PEDERSEN, *Primary Examiner.*

R. L. WIBERT, *Assistant Examiner.*